United States Patent [19]

Miller et al.

[11] 4,034,001

[45] July 5, 1977

[54] BIS-AMIDOALKANESULFONIC ACIDS AND SALTS THEREOF

[75] Inventors: Leonard Edward Miller, Chagrin Falls; Donald Leon Murfin, Mentor, both of Ohio

[73] Assignee: The Lubrizol Corporation, Cleveland, Ohio

[22] Filed: July 28, 1975

[21] Appl. No.: 599,613

Related U.S. Application Data

[60] Continuation-in-part of Ser. No. 216,290, Jan. 7, 1972, abandoned, and a continuation-in-part of Ser. No. 889,806, Dec. 12, 1969, abandoned, which is a division of Ser. No. 619,923, March 2, 1967, Pat. No. 3,531,442.

[52] U.S. Cl. .................. 260/513 N; 260/513 R; 260/507 R; 260/503; 260/470; 260/481 R; 260/456 A; 260/429.9; 260/438.1; 260/435 R; 260/448 R; 260/439 R; 260/513 T; 260/29.6 R; 260/79.3 R; 252/33; 252/45; 252/47; 252/536; 252/537; 8/76; 526/72; 526/304; 526/310

[51] Int. Cl.$^2$ .................. C07C 143/16
[58] Field of Search ........ 260/513 N, 507 R, 513 T

[56] References Cited

UNITED STATES PATENTS

| | | | |
|---|---|---|---|
| 2,983,712 | 5/1961 | Wilkinson | 260/513 N |
| 3,235,549 | 2/1966 | Broussalian | 260/513 N |
| 3,344,174 | 9/1967 | Broussalian | 260/513 N |
| 3,478,091 | 11/1969 | Murfin et al. | 260/513 N |
| 3,531,442 | 9/1970 | Miller et al. | 260/513 N |
| 3,544,597 | 12/1970 | Killam | 260/513 N |

*Primary Examiner*—James O. Thomas, Jr.
*Assistant Examiner*—Nicky Chan
*Attorney, Agent, or Firm*—James W. Adams, Jr.; William H. Pittman

[57] ABSTRACT

Bis-amidoalkanesulfonic acids and their salts find use in applications where amides and sulfonic compounds are useful. Bis-acrylamides and the like are polymerizable monomers whose polymers are useful as gelling agents for aqueous systems, as well as for the preparation of fibers, plastics, resins, etc.

15 Claims, No Drawings

BIS-AMIDOALKANESULFONIC ACIDS AND SALTS THEREOF

This application is a continuation-in-part of copending application Ser. No. 216,290, filed Jan. 7, 1972, now abandoned. Said application is a continuation-in-part of Ser. No. 889,806, filed Dec. 12, 1969, now abandoned, which in turn is a division of application Ser. No. 619,923, filed Mar. 2, 1967, now U.S. Pat. No. 3,531,442.

This invention relates to new compositions of matter, and more particularly to compounds of the formula

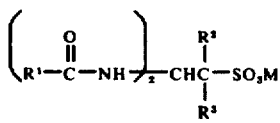

wherein $R^1$ is a hydrocarbon-based radical; each of $R^2$ and $R^3$ is hydrogen or a hydrocarbon-based radical; and M is hydrogen or one equivalent of a cation.

As used herein, the term "hydrocarbon-based radical" denotes a radical having a carbon atom directly attached to the remainder of the molecule and having predominantly hydrocarbon character within the context of this invention. Such radicals include the following:

1. Hydrocarbon radicals; that is, aliphatic, (e.g., alkyl or alkenyl), alicyclic (e.g., cycloalkyl or cycloalkenyl), aromatic, aliphatic- and alicyclic-substituted aromatic, aromatic-substituted aliphatic and alicyclic radicals, and the like, as well as cyclic radicals wherein the ring is completed through another portion of the molecule (that is, two indicated substituents may together form an alicyclic radical). Such radicals are known to those skilled in the art; examples include methyl, ethyl, propyl, butyl, hexyl, octyl, decyl, vinyl, allyl, benzyl, cyclohexyl, cyclopentyl, methylcyclopentyl, cyclopentadienyl, vinylphenyl, isopropenylphenyl, cinnamyl, naphthyl, phenyl, tolyl, xylyl, $-C_6H_3(C_2H_5)_2$, $-C_6H_4(CH_2)_{11}CH_3$,

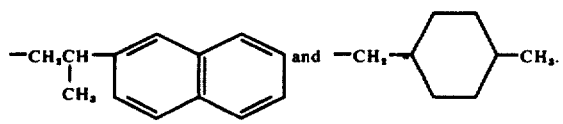

2. Substituted hydrocarbon radicals; that is, radicals containing non-hydrocarbon substituents which, in the context of this invention, do not alter the predominantly hydrocarbon character of the radical. Those skilled in the art will be aware of suitable substituents [e.g., halide, nitro,

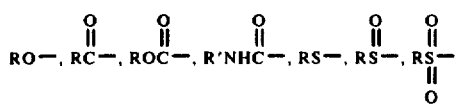

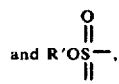

wherein R is a hydrocarbon (preferably a lower alkyl) radical and R' is hydrogen or a hydrocarbon (preferably a lower alkyl) radical].

3. Hetero radicals; that is, radicals which, while predominantly hydrocarbon in character within the context of this invention, contain atoms other than carbon present in a chain or ring otherwise composed of carbon atoms. Suitable hetero atoms will be apparent to those skilled in the art and include, for example, oxygen, sulfur and nitrogen.

In general, no more than about three substituents or hetero atoms, and preferably no more than one, will be present for each 10 carbon atoms in the hydrocarbon-based radical.

In the preferred compounds according to this invention, R' is an alkenyl radical having no more than about 12 carbon atoms, such as vinyl, alkyl-substituted vinyl, allyl and the like. The olefinic group in said alkenyl radical may be either terminal or medial. At least one of $R^2$ and $R^3$ is usually a hydrocarbon radical, preferably an alkyl or aryl radical having no more than about 18 carbon atoms. A particular preference is expressed for compounds in which at least one of $R^2$ and $R^3$, and preferably both, are lower alkyl radicals, the word "lower" denoting radicals containing up to 7 carbon atoms.

As indicated, M is hydrogen or a cation, typically a metal cation (e.g., alkali metal, alkaline earth metal, zinc, copper, lead, aluminum, iron) or an ammonium cation (either unsubstituted or substituted, the latter including cations derived from aliphatic, aromatic and heterocyclic amines and including quaternary ammonium ions).

The sulfonic acids of this invention are illustrated by those in which the various R radicals are as identified in the following table.

| $R^1$ | $R^2$ | $R^3$ |
|---|---|---|
| $CH_3$ | $C_2H_5$ | H |
| $C_6H_5$ | $C_2H_5$ | H |
| Cyclohexyl | $C_6H_5$ | H |
| $CH_2=CH$ | $CH_3$ | H |
| $CH_2=CH$ | $CH_3$ | $CH_3$ |
| $CH_2=CH$ | $C_2H_5$ | $C_2H_5$ |
| $CH_2=CH$ | $CH_3(CH_2)_3$ | $C_2H_5$ |
| $CH_2=C-$<br>$\|$<br>$CH_3$ | $CH_3(CH_2)_7$ | $C_2H_5$ |
| $CH_3(CH_2)_7CH=CH(CH_2)_7CH$ | $CH_3(CH_2)_4$ | $CH_3$ |
| $CH_3$ | $CH_3$ | Cyclohexyl |

The compounds of this invention may be prepared by reacting an aldehyde of the formula

with a nitrile of the formula $R^1CN$ and a sulfonating agent. Usually, a mixture of the aldehyde and nitrile is sulfonated. The sulfonating agent is usually concentrated (e.g., 90% or greater), or fuming sulfuric acid, but it may be sulfur trioxide, chlorosulfonic acid or any other known sulfonating agent. Stoichiometrically, the reaction involves two moles of nitrile and one mole each of the aldehyde and sulfonating agent. However, it is often advantageous to use an excess of the nitrile, up to about 100 times the stoichiometric amount based on the amount of aldehyde used, the excess serving as a solvent or diluent. It is also often preferable to use an excess of the sulfonating agent, up to about 10 times the stoichiometric amount based on the aldehyde, in order to facilitate the sulfonation reaction. The reaction temperature is between about −30° and 250° C., usually between about −30° and 80° C. Other diluents or solvents such as dioxane, n-hexane, ethylene dichloride, ethylene dibromide or naphtha may be present. When the reaction is complete, the compound may be isolated by typical methods. If the solvent is excess acrylonitrile, the product precipitates from the reaction mixture and may be removed and purified as necessary.

The above-described method is particularly adapted for use in continuous systems. Typically, a mixture of the sulfonating agent and the nitrile is prepared at a temperature between about −20° and −45° C. and the aldehyde is added thereto; subsequently, the temperature is allowed to rise to about 15°–60° C. whereupon the compound of this invention precipitates and may be collected by filtration and purified. However, it is frequently found that the compound prepared by this method is pure enough for use without further purification processes other than washing (by a suitable solvent such as the nitrile) and drying.

The compounds of this invention may also be prepared by sulfonating the aldehyde to form an α-sulfoaldehyde and subsequently reacting said α-sulfoaldehyde with the nitrile. In the second step of this reaction sequence, it is sometimes preferred to employ an acidic catalyst. This catalyst will usually be identical with the sulfonating agent employed in the first stage of the reaction sequence, but it may be necessary to add an additional amount of acidic compound to promote the reaction with the nitrile.

The preparation of the sulfonic acids of this invention is illustrated by the following examples. (Salts of said acids may be prepared by neutralization.) All parts are by weight unless otherwise indicated.

EXAMPLE 1

To a solution of sulfur trioxide (160 grams, 2 moles) in a solvent mixture consisting of dioxane (352 grams) and ethylene dichloride (750 ml.) there is added at −20° C. isobutyraldehyde (144 grams, 2 moles). After the addition, the reaction mixture is allowed to warm to room temperature (25° C.) and is maintained at that temperature for one hour. To the mixture there is then added acrylonitrile (2190 grams, 30 moles) and 96% aqueous sulfuric acid (294 grams, 3 moles). An exothermic reaction occurs and the temperature of the reaction mixture is maintained at 40° C. until the reaction is complete. The product of such reaction is 1,1-bis-(acrylamido)-2-methylpropane-2-sulfonic acid. The reaction mixture is then cooled to 0° C. and treated with anhydrous ammonia in an amount sufficient to neutralize the sulfonic acid. The mixture is further diluted with either ethylene dichloride or acrylonitrile whereupon the ammonium salt of the sulfonic acid is precipitated. The precipitate is collected on a filter and the product is purified by dissolving it in methanol, filtering the methanol solution, evaporating the methanol from the filtrate so as to recover the ammonium salt, washing the ammonium salt with acetone and ether and then drying ammonium salt at 45°–55° C. in vacuum.

EXAMPLE 2

To a mixture of acrylonitrile (397 grams, 7.5 moles) and isobutyraldehyde (36 grams, 0.5 mole) there is added at 0° C. fuming sulfuric acid (20% $SO_3$) (150 grams, 1.6 moles). The reaction mixture is maintained at 35° C. until the reaction is complete whereupon 1,1-bis(acrylamido)-2-methylpropane-2-sulfonic acid is formed. The acid is neutralized with ammonia and the ammonium salt, after purification, contains 14.98% nitrogen (theory 14.33%), 39.6% carbon (theory 40.94%) and 6.62% hydrogen (theory 6.53%).

EXAMPLE 3

1,1-Bis(acetamido)-2-methylpropane-2-sulfonic acid is prepared by the procedure of Example 1 wherein acetonitrile is used in place of acrylonitrile.

EXAMPLE 4

1,1-Bis(propionamido)-2-cyclohexylbutane-3-sulfonic acid is prepared by the procedure of Example 1 wherein propionitrile is used in place of acrylonitrile and 2-cyclohexylbutyraldehyde is used in place of isobutyraldehyde.

EXAMPLE 5

1,1-Bis(methacrylamido)-2-ethyldecane-2-sulfonic acid is obtained by the procedure of Example 1 wherein methacrylonitrile is used in place of acrylonitrile and 2-ethyldecanal is used in place of isobutyraldehyde.

EXAMPLE 6

1,1-Bis(oleamido)-2-methylheptane-2-sulfonic acid is prepared by the procedure of Example 2 wherein oleonitrile is used in place of acrylonitrile and 2-methylheptanal is used in place of isobutyraldehyde.

EXAMPLE 7

A laboratory-scale continuous system is prepared by connecting a flask (Flask A) having a discharge outlet, two inlets and a stirrer, to one arm of a Y-shaped adapter and fitting the other arm thereof with an addition funnel. The adapter is connected to a second flask (Flask B) fitted with a stirrer and thermometer, which is in turn connected by an overflow-type connection with a third flask (Flask C) fitted with a stirrer, thermometer and Dry Ice condenser.

Acrylonitrile and fuming sulfuric acid (6% sulfur trioxide) are fed to Flask A at rates of 23.5 parts per minute and 4.49 parts per minute, respectively, the fuming sulfuric acid addition being begun one minute after the acrylonitrile feed. The acrylonitrile-sulfuric acid mixture passes into Flask B and isobutyraldehyde is simultaneously added from the addition funnel, at 3.08 parts per minute, beginning two minutes after the acrylonitrile feed. The temperature of Flask A is maintained at −20° to −25° C., and Flask B at −25° to −38° C. The residence time in Flask B is 14 minutes whereupon the mixture passes to Flask C, maintained at 19°–23° C. The solid 1,1-bis(acrylamido)-2-methylpropane-2-sulfonic acid which precipitates is collected from Flask C, washed with acrylonitrile and dried in vacuum.

EXAMPLE 8

Following the procedures of Example 7, 1,1-bis-(acrylamido)-2-ethyl-2-butanesulfonic acid is prepared by the reaction of acrylonitrile with fuming sulfuric acid (20% sulfur trioxide) and 2-ethylbutanal. The flow rates are: Acrylonitrile, 23.5 parts per minute; fuming sulfuric acid, 4.30 parts per minute; and 2-ethylbutanal, 4.29 parts per minute. The temperature ranges are: Flask A, −20° to −25° C.; Flask B, −30° to −40° C.; Flask C, 11°–27° C.

EXAMPLE 9

Following the procedure of Example 7, 1,1-bis-(acrylamido)-2-ethyl-2-hexanesulfonic acid is prepared from acrylonitrile, fuming sulfuric acid (5% sulfur trioxide) and 2-ethylhexanal. The flow rates are: Acrylonitrile, 23.5 parts per minute; fuming sulfuric acid, 4.34 parts per minute; 2-ethylhexanal, 5.49 parts per minute. The temperature ranges are: Flask A, −20° to −25° C.; Flask B, −35° to −40° C.; Flask C, 25°–37° C.

The compounds of this invention are useful for many purposes. Those containing a relatively high molecular weight substituent having, for example, 12 or more aliphatic carbon atoms in a aliphatic hydrocarbon chain are miscible with organic substances such as plastics, oils, fuels, paints, asphalts, etc. They are thus useful as additives in such compositions. A particularly desirable use is as an additive in a lubricating composition such as a mineral lubricant or a synthetic lubricant. Mineral lubricants are derived from mineral oils such as SAE 5 to SAE 90 grade oils. Synthetic lubricants are derived from silicone oils or the so-called "diester" or "polyester" oils. The concentration of the compound of this invention in such lubricating composition usually ranges from about 0.01% to about 10% or 20% by weight. For example, the compound of Example 6 is useful in the preparation of detergent additives for hydrocarbon fuels and lubricants. More specifically, the calcium salt of the compound of Example 6 is useful as a detergent additive in the crankcase lubricant for automotive engines. Such lubricant can be prepared by blending SAE 30 mineral lubricating oil and 2.5% by weight of said calcium salt.

Another utility of the compounds of this invention is in the preparation of aqueous detergent compositions. For example, an aqueous solution containing 3% of the potassium salt of 1,1-bis(butyramido)-2-methylpropane-2-sulfonic acid is useful as a detergent composition. In general, when used for such purpose the compounds of this invention should contain less than a total of about 30 carbon atoms so as to meet the requirement of sufficient solubility in aqueous systems. The concentration of the compound in an aqueous system usually ranges from about 0.01% to about 10% by weight. The compounds of this invention are useful in applications such as are discussed in U.S. Pat. No. 3,303,137.

The compounds of this invention in which the amido group contains a polymerizable olefinic linkage (e.g., those in which R¹ is alkenyl) may be polymerized under free-radical conditions, either alone or in the the presence of other monomers. The term "polymer", as used herein, includes addition homopolymers, copolymers, terpolymers and other interpolymers.

Polymerization by the free-radical method may be effected in bulk, solution, suspension or emulsion, by contacting the monomer or monomers with a polymerization initiator either in the absence or presence of a diluent at a temperature of about 0°–200° C. Suitable initiators include benzoyl peroxide, tertiary butyl hydroperoxide, acetyl peroxide, hydrogen peroxide, azobisisobutyronitrile, persulfate-bisulfite persulfate-sodium formaldehyde sulfoxylate, chlorate-sulfite and the like.

Suitable emulsifiers for use in the preparation of emulsion polymers of this invention include cationic materials such as stearyl dimethyl benzyl ammonium chloride; non-ionic materials such as alkyl aryl polyether alcohols and sorbitan mono-oleate; anionic materials such as sodium decylbenzene sulfonate, dioctyl sodium sulfosuccinate, sodium salts of alkyl aryl polyether sulfates, and sodium lauryl sulfate; alkali metal salts of lignosulfonic acids, silicic acids and the like; and colloidal materials such as casein, sodium polyacrylate, carboxymethylcellulose, hydroxyethylcellulose, gum tragacanth, sodium alginate, gelatin, methylcellulose, gum arabic, dextrins or polyvinyl alcohol.

A large variety of polymerizable compounds can be used to form interpolymers of this invention. They include (1) esters of unsaturated alcohols, (2) esters of unsaturated acids, (3) esters of unsaturated polyhydric alcohols, (4) vinyl cyclic compounds, (5) unsaturated ethers, (6) unsaturated ketones, (7) unsaturated amides, (8) unsaturated aliphatic hydrocarbons, (9) vinyl halides, (10) unsaturated acids, (11) unsaturated acid anhydrides, (12) unsaturated acid chlorides, and (13) unsaturated nitriles. Specific illustrations of such compounds are:

1. Unsaturated alcohols and esters thereof: Allyl, methallyl, crotyl, 1-chloroallyl, 2-chloroallyl, cinnamyl, vinyl, methylvinyl, 1-phenallyl, butenyl alcohols, and esters of such alcohols with saturated acids such as acetic, propionic, butyric, valeric, caproic and stearic; with unsaturated acids such as acrylic, alpha-substituted acrylic (including alkylacrylic, e.g., methacrylic, ethylacrylic, propylacrylic, etc., and arylacrylic such as phenylacrylic), crotonic, oleic, linoleic and linolenic; with polybasic acids such as oxalic, malonic, succinic, glutaric, adipic, pimelic, suberic, azelaic and sebacic; with unsaturated polybasic acids such as maleic, fumaric, citraconic, mesaconic, itaconic, methylenemalonic, acetylenedicarboxylic and aconitic; and with aromatic acids, e.g., benzoic, phenylacetic, phthalic, terephthalic and benzoylphthalic acids.

2. Esters of saturated alcohols, such as methyl, ethyl, propyl, isopropyl, butyl, isobutyl, sec-butyl, tert-butyl, 2-ethylhexyl, cyclohexyl or behenyl alcohols, with unsaturated aliphatic monobasic and polybasic acids, examples of which are illustrated above.

3. Esters of unsaturated polyhydric alcohols, e.g., butenediol, with saturated and unsaturated aliphatic and aromatic, monobasic and polybasic acids, illustrative examples of which appear above.

4. Vinyl cyclic compounds including styrene, o-, m-, p-chlorostyrenes, bromostyrenes, fluorostyrenes, methylstyrenes, ethylstyrenes and cyanostyrenes; di-, tri-, and tetra-chlorostyrenes, bromostyrenes, fluorostyrenes, methylstyrenes, ethylstyrenes, cyanostyrenes; vinylnaphthalene, vinylcyclohexane, divinylbenzene, trivinylbenzene, allylbenzene, and heterocycles such as vinylfuran, vinylpyridine, vinylbenzofuran, N-vinylcarbazole, N-vinylpyrrolidone and N-vinyloxazolidone.

5. Unsaturated ethers such as methyl vinyl ether, ethyl vinyl ether, cyclohexyl vinyl ether, octyl vinyl ether, diallyl ether, ethyl methallyl ether and allyl ethyl ether.

6. Unsaturated ketones, e.g., methyl vinyl ketone and ethyl vinyl ketone.

7. Unsaturated amides, such as acrylamide, methacrylamide, N-methylacrylamide, N-phenylacrylamide, N-allylacrylamide, N-methylolacrylamide, N-allylcaprolactam and diacetone acrylamide.

8. Unsaturated aliphatic hydrocarbons, for instance, ethylene, propylene, butenes, butadiene, isoprene, 2-chlorobutadiene and alpha-olefins in general.

9. Vinyl halides, e.g., vinyl fluoride, vinyl chloride, vinyl bromide, vinylidene chloride, vinylidene bromide, allyl chloride and allyl bromide.

10. Unsaturated acids (for example, acrylic, methacrylic, propylacrylic), examples of which appear above.

11. Unsaturated acid anhydrides, e.g., maleic, citraconic, itaconic, cis-4-cyclohexene-1,2-dicarboxylic and bicyclo(2,2,1)-5-heptene-2,3-dicarboxylic anhydrides.

12. Unsaturated acid halides such as cinnamoyl, acrylyl, methacrylyl, crotonyl, oleyl and fumaryl chlorides or bromides.

13. Unsaturated nitriles, e.g., acrylonitrile, methacrylonitrile and other substituted acrylonitriles.

The preparation of polymers of this invention is illustrated by the following examples.

EXAMPLE 9

A copolymer of ammonium 1,1-bis(acrylamido)-2-methylpropane-2-sulfonate and ethyl acrylate is obtained by adding aqueous ammonium persulfate (0.25 gram) and aqueous sodium metabisulfite (0.11 gram) to a mixture of water (300 ml.), the ammonium salt (0.5 gram) and ethyl acrylate (49.5 grams) at 40° C. The copolymer is isolated from the mixture as a resinous solid.

EXAMPLE 10

A homopolymer of ammonium 1,1-bis(acrylamido)-2-methylpropane-2-sulfonate is obtained by treating a mixture of the ammonium salt (50 grams) and water (450 ml.) with two portions of aqueous ammonium persulfate (0.25 gram) and aqueous sodium metabisulfite (0.11 gram) at room temperature. A white solid polymer is obtained.

EXAMPLE 11

A copolymer of ammonium 1,1-bis(acrylamido)-2-methylpropane-2-sulfonate and diacetone acrylamide is obtained by treating a mixture of 0.5 gram of the ammonium salt and 49.5 grams of diacetone acrylamide in 400 ml. of water with aqueous ammonium persulfate (0.25 gram) and aqueous sodium metabisulfite (0.11 gram) at room temperature until the polymerization is complete. A white solid polymer is obtained.

The polymers of this invention are useful in the preparation of plastics, fibers, resins, and other polymeric compositions. Because of the presence of multifunctional groups in the bis-amides, the polymers derived therefrom possess new and useful properties. For example, the sulfonic group imparts dye susceptibility and anti-static properties to the polymer. Consequently, a fibrous composition containing the polymers of the bis-amides of this invention has improved dye susceptibility properties and anti-static properties. A useful fibrous composition is thus exemplified by a fiber blend consisting of 96% by weight of nylon (polycaprolactam) or polyacrylonitrile and 4% by weight of a fibrous polymer of 1,1-bis(acrylamido)-2-methylpropane-2-sulfonic acid. Another fibrous composition is formed by interpolymerizing 1,1-bis(acrylamido)-2-methylpropane-2-sulfonic acid (5 mole percent) with acrylonitrile (95 mole percent).

Another utility of the polymers of this invention is associated with their ability to act as non-Newtonian agents for aqueous systems. For example, the addition of 0.5 gram of the polymer of Example 10 to 100 ml. of water imparts non-Newtonian properties to the aqueous system. These properties are demonstrated as follows. An aqueous system is agitated at room temperature (25° C.) by means of a stirrer rotating at a specific speed. The viscosity of the system after one minute of agitation at a specific speed is then measured and is reported in terms of centipoises per second (cps). For comparison, the viscosity value of water is likewise measured (at 77° C.). The results of the measurements are reported in Table I below.

Table I

| System | Stirrer Speed Revolution/minute | Viscosity (cps) |
|---|---|---|
| A. Aqueous solution of 0.5 gram of the polymer of Example 10 in 100 ml. of water | 2 | 4300 |
| | 4 | 2875 |
| | 10 | 1700 |
| | 20 | 1150 |
| B. Water (measured at 77° C.) | 2 | 3 |
| | 4 | 6 |
| | 10 | 8 |
| | 20 | 8 |

It is noted that the polymer is an effective thickener for aqueous systems, as shown by the relatively high viscosity values for System A. Further, the viscosity of System A decreases with an increase in the stirrer speed or shear rate; such decrease is indicative of the non-Newtonian characteristics of the system. Such property is desirable for so-called "non-drip" or thixotropic paints. Thus an example of a paint composition is as follows: A composition consisting of 85 parts (by weight) of water, 275 parts of titanium dioxide (pigment), 10 parts of a polyethylene glycol mono-heptylphenyl ether (emulsifier), 550 parts of an acrylic latex (consisting of 44% by weight of poly(methyl methacrylate) resin and 56% of water), and 10 parts of the polymer of Example 10 as the thixotropic agent. When used as a non-Newtonian additive, the polymer is usually present as a concentration ranging from about 0.1 to about 10 parts by weight per 100 parts of the composition.

What is claimed is:

1. A compound having the formula

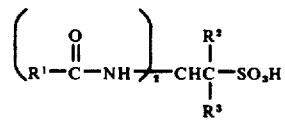

wherein R¹ is an alkenyl radical having no more than about 12 carbon atoms and each of R² and R³ is hydrogen or an alkyl radical having up to about 18 carbon atoms.

2. A compound according to claim 1 wherein R¹ is vinyl and each of R² and R³ is lower alkyl.

3. A compound according to claim 2 wherein each of R² and R³ is methyl.

4. A compound having the formula

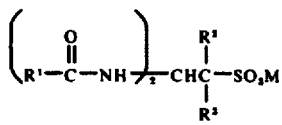

wherein $R^1$ is an alkenyl radical having no more than about 12 carbon atoms; each of $R^2$ and $R^3$ is hydrogen or an alkyl radical having up to about 18 carbon atoms; and M is one equivalent of an alkali metal, alkaline earth metal or ammonium cation.

5. A compound according to claim 4, wherein $R^1$ is vinyl and each of $R^2$ and $R^3$ is lower alkyl.

6. A compound according to claim 5, wherein each of $R^2$ and $R^3$ is methyl.

7. A method for preparing a compound according to claim 1 which comprises reacting, at a temperature between about $-30°$ and $250°$ C., an aldehyde of the formula

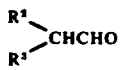

with a nitrile of the formula $R^1CN$ and a sulfonating agent comprising sulfuric acid, sulfur trioxide or fuming sulfuric acid, wherein $R^1$, $R^2$ and $R^3$ are as defined in claim 1.

8. A method according to claim 7 wherein the sulfonating agent is sulfuric acid or fuming sulfuric acid.

9. A method according to claim 8 wherein the reaction is carried out continuously.

10. A method according to claim 8 wherein $R^1$ is vinyl and each of $R^2$ and $R^3$ is lower alkyl.

11. A method according to claim 10 wherein each of $R^2$ and $R^3$ is methyl.

12. A method according to claim 11 wherein the reaction is carried out continuously.

13. A method for preparing a compound according to claim 1 which comprises sulfonating, at a temperature between about $-30°$ and $250°$ C., an aldehyde of the formula

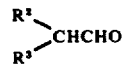

with sulfuric acid, sulfur trioxide or fuming sulfuric acid to form an α-sulfoaldehyde, and subsequently reacting said α-sulfoaldehyde with a nitrile of the formula $R^1CN$, wherein $R^1$, $R^2$ and $R^3$ are as defined in claim 1.

14. A method according to claim 13 wherein $R^1$ is vinyl, each of $R^2$ and $R^3$ is lower alkyl and the sulfonation is effected with sulfuric acid or fuming sulfuric acid.

15. A method according to claim 14 wherein each of $R^2$ and $R^3$ is methyl.

* * * * *